(12) United States Patent
Benson et al.

(10) Patent No.: US 11,689,510 B2
(45) Date of Patent: Jun. 27, 2023

(54) CRYPTOGRAPHIC PLATFORM SYSTEM AND METHOD

(71) Applicant: TrustFour Technologies, Inc., San Diego, CA (US)

(72) Inventors: Glenn Stuart Benson, Newton, MA (US); Robert Alan Levine, San Diego, CA (US)

(73) Assignee: TrustFour Technologies, Inc., San Diego, CA (US)

(*) Notice: Subject to any disclaimer, the term of this patent is extended or adjusted under 35 U.S.C. 154(b) by 103 days.

(21) Appl. No.: 17/492,023

(22) Filed: Oct. 1, 2021

(65) Prior Publication Data
US 2022/0182413 A1    Jun. 9, 2022

Related U.S. Application Data

(60) Provisional application No. 63/122,601, filed on Dec. 8, 2020.

(51) Int. Cl.
| | |
|---|---|
| *H04L 29/06* | (2006.01) |
| *H04L 9/40* | (2022.01) |
| *H04L 9/14* | (2006.01) |
| *G06F 9/54* | (2006.01) |
| *H04L 9/08* | (2006.01) |
| *H04L 9/32* | (2006.01) |

(52) U.S. Cl.
CPC ......... *H04L 63/0428* (2013.01); *G06F 9/541* (2013.01); *H04L 9/085* (2013.01); *H04L 9/0838* (2013.01); *H04L 9/14* (2013.01); *H04L 9/3221* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 7,353,388 B1* | 4/2008 | Gilman | H04L 9/3273 713/168 |
| 10,425,401 B1* | 9/2019 | Pecen | H04L 63/0815 |
| 11,481,336 B2* | 10/2022 | Grosz | G06F 12/1408 |
| 2019/0052608 A1* | 2/2019 | Skuratovich | H04L 9/0819 |
| 2019/0097982 A1* | 3/2019 | Bhattacharyya | H04L 9/14 |
| 2020/0366291 A1* | 11/2020 | Kuenemund | H03K 19/094 |

OTHER PUBLICATIONS

Search Report for International Patent Application PCT/US2021/060427, dated Feb. 8, 2022, 6 pages.

* cited by examiner

*Primary Examiner* — Sanchit K Sarker
(74) *Attorney, Agent, or Firm* — Fresh IP PLC; John R. Bednarz

(57) ABSTRACT

A method includes requesting, by a first computing device having a first application and a first Transport Layer Security (TLS) library, a sequence of cryptographic keys obtained by a first agent, the sequence of cryptographic keys based on an agent key and provided from the first agent to the first TLS library, requesting, by a second computing device having a second application and a second TLS library, the sequence of cryptographic keys obtained by a second agent, the sequence of cryptographic keys based on the agent key and provided from the second agent to the second TLS library, and communicating between the first application of the first computing device to the second application of the second computing device using the sequence of cryptographic keys based on the agent key.

24 Claims, 6 Drawing Sheets

CRYPTOGRAPHIC PLATFORM SYSTEM AND METHOD

CROSS-REFERENCE TO RELATED APPLICATION

This application claims the benefit of U.S. Provisional Application No. 63/122,601 filed Dec. 8, 2020, entitled "Cryptographic Platform System and Method," the entire contents of which is incorporated herein by reference.

BACKGROUND

Cryptographic protocols such as Transport Layer Security (TLS), Internet Protocol Security (IPSec), and Secure Shell (SSH) permit applications operating on different computing devices located at a physical distance to communicate privately using encryption, and if properly configured, mutually authenticated transmissions. Although there is a way for each party to authenticate its peer, key management and visibility provide significant hurdles. An enterprise having a plurality of applications may not have the computational or financial ability to implement, manage, and/or refactor its applications to obtain cryptographic improvements including authentication.

It is with these issues in mind, among others, that various aspects of the disclosure were conceived.

SUMMARY

According to one aspect, a cryptographic platform system and method is provided for providing mutual authentication with cryptoagility and helps to eliminate refactoring application code. Pervasive mutual authentication provides controls that may limit lateral movement and cryptoagility may allow an enterprise to upgrade its cryptographic hygiene. The system provides mutual authentication and rotating cryptographic keys. In addition, the system allows for removing older or obsolete versions of encryption protocols. The system further provides a way to transition to quantum-safe computing that may leverage algorithms that are designed to be safe from quantum crypto-analysis. The system may be executed by computing devices with a variety of computational ability including mobile computing devices and computing devices associated with Internet of Things (IoT). Often mobile computing devices and IoT devices may not be capable of handling asymmetric cryptographic tasks and may benefit from mutual authentication with rotating cryptographic keys.

In one example, a method may include requesting, by a first computing device having a first application and a first Transport Layer Security (TLS) library, a sequence of cryptographic keys obtained by a first agent, the sequence of cryptographic keys based on an agent key and provided by the first agent to the first TLS library, requesting, by a second computing device having a second application and a second TLS library, the sequence of cryptographic keys obtained by a second agent, the sequence of cryptographic keys based on the agent key and provided by the second agent to the second TLS library, and communicating between the first application of the first computing device to the second application of the second computing device using the sequence of cryptographic keys based on the agent key.

In another example, a system may include a first computing device having a memory, at least one processor, a first application, and a first Transport Layer Security (TLS) library, the first computing device to request a sequence of cryptographic keys obtained by a first agent, the sequence of cryptographic keys based on an agent key and provided by the first agent to the first TLS library, a second computing device having a memory, at least one processor, a second application, and a second TLS library, the second computing device to request the sequence of cryptographic keys obtained by a second agent, the sequence of cryptographic keys based on the agent key and provided by the second agent to the second TLS library, and the first computing device and the second computing device to communicate between the first application of the first computing device and the second application of the second computing device using the sequence of cryptographic keys based on the agent key.

In another example, a non-transitory computer-readable storage medium, may have instructions stored thereon that, when executed by at least one computing device cause the at least one computing device to perform operations, the operations including requesting, by a first computing device having a first application and a first Transport Layer Security (TLS) library, a sequence of cryptographic keys obtained by a first agent, the sequence of cryptographic keys based on an agent key and provided by the first agent to the first TLS library, requesting, by a second computing device having a second application and a second TLS library, the sequence of cryptographic keys obtained by a second agent, the sequence of cryptographic keys based on the agent key and provided by the second agent to the second TLS library, and communicating between the first application of the first computing device to the second application of the second computing device using the sequence of cryptographic keys based on the agent key.

In another example, a method includes linking a first application with a first Transport Layer Security (TLS) library, linking a second application with a second TLS library, obtaining a sequence of cryptographic keys by a first agent, the sequence of cryptographic keys based on an agent key and provided from the first agent to the first TLS library, obtaining the sequence of cryptographic keys by a second agent, the sequence of cryptographic keys based on the agent key and provided from the second agent to the second TLS library, establishing communication between the first TLS library and the first agent to create a first trusted relationship between the first application and the first TLS library, establishing communication between the second TLS library and the second agent to create a second trusted relationship between the second application and the second TLS library, establishing a third trusted relationship between the first agent and the second agent, and establishing communication between the first application and the second application based on the third trusted relationship.

In another example, a system includes a first computing device having a first application to link with a first Transport Layer Security (TLS) library, a second computing device having a second application to link with a second TLS library, a first agent to obtain a sequence of cryptographic keys, the sequence of cryptographic keys based on an agent key and provided from the first agent to the first TLS library, a second agent to obtain the sequence of cryptographic keys, the sequence of cryptographic keys based on the agent key and provided from the second agent to the second TLS library, the first computing device to establish communication between the first TLS library and the first agent to create a first trusted relationship between the first TLS library and the first agent, the second computing device to establish communication between the second TLS library and the second agent to create a second trusted relationship between the second TLS library and the second agent, the first agent and the second agent to establish a third trusted relationship, and the first computing device and the second computing device to establish communication between the first application and the second application based on the third trusted relationship.

In another example, a non-transitory computer-readable storage medium includes instructions stored thereon that, when executed by at least one computing device cause the at least one computing device to perform operations, the operations including linking a first application with a first Transport Layer Security (TLS) library, linking a second application with a second TLS library, obtaining a sequence of cryptographic keys by a first agent, the sequence of cryptographic keys based on an agent key and provided from the first agent to the first TLS library, obtaining the sequence of cryptographic keys by a second agent, the sequence of cryptographic keys based on the agent key and provided from the second agent to the second TLS library, establishing communication between the first TLS library and the first agent to create a first trusted relationship between the first TLS library and the first agent, establishing communication between the second TLS library and the second agent to create a second trusted relationship between the second TLS library and the second agent, establishing a third trusted relationship between the first agent and the second agent, and establishing communication between the first application and the second application based on the third trusted relationship.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
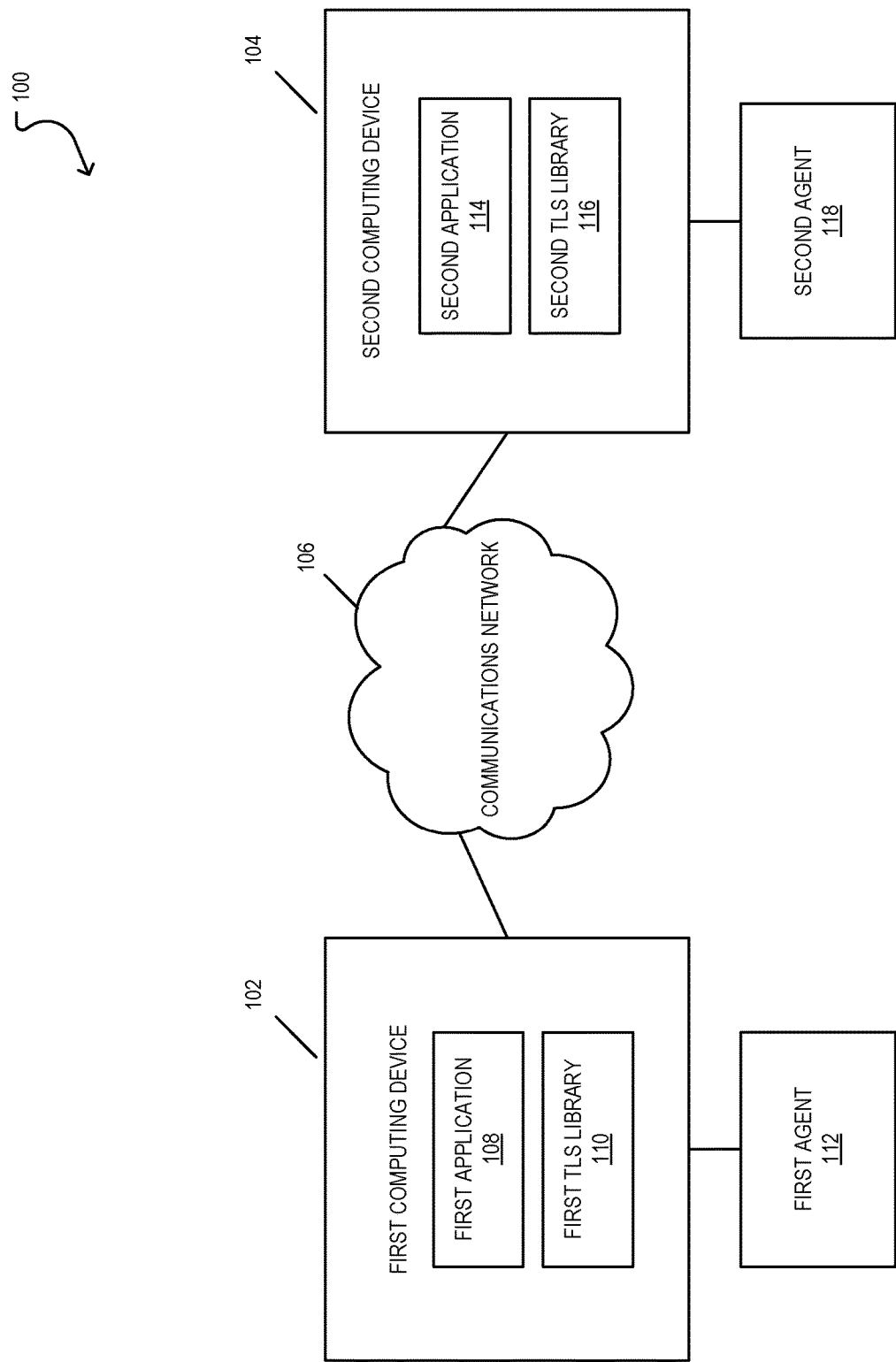
FIG. 1 is a block diagram of a cryptographic platform system according to an example of the instant disclosure.

An enterprise having a plurality of applications may not have the computational or financial ability to implement, manage, and/or refactor its applications to obtain cryptographic improvements including authentication. However, if an enterprise were to be able to update, they could realize many security advantages. As an example, mutual authentication may offer improved protection against unauthorized lateral movement. When an adversary compromises one component or computing device, the adversary could launch attacks on other components or computing devices. Visibility may offer the enterprise reporting upon its usage of cryptographic protocols, cryptographic protocol versions, algorithms, key length, and key expiration. Cryptoagility may offer the enterprise an upgrade path to move to updated versions of cryptographic protocols, algorithms, or key lengths. As a result, the enterprise could effectively update cryptographic hygiene to harden against attack.

As an example, a pre-shared key (PSK) may be used to mutually authenticate peers. Each peer may validate that another peer knows a value of a pre-shared key to mutually authenticate. As an example, a sequence of pre-shared keys may be PSK-1 . . . PSK-n. PSKs may be at least 128 bits, but also may be 256 bits or another length. Mutually validating PSKs often utilizes cryptographic mechanisms. A first peer may not simply demonstrate that the first peer knows a PSK by sending the PSK to a second peer. If the first peer sends the PSK to another party which could be the second peer, the other party would discover the PSK before demonstrating that the other party is the correct second peer. The Socialist Millionaire Protocol (SMP) provides a way of allowing peers to mutually demonstrate that they know the PSK without revealing the PSK. In addition, RFC 4279 provides three different methods of authenticated key agreements. DHE_PSK authenticates peers of a TLS connection using a PSK and additionally creates a shared secret known by both peers. The shared secret offers forward secrecy and can be used to derive cryptographic keys known only to the respective peers.

A cryptographic platform system and method provides pervasive mutual authentication with cryptoagility and visibility without having to refactor application code. Pervasive mutual authentication may provide controls that may limit lateral movement; and cryptoagility may allow an enterprise to upgrade cryptographic hygiene of encryption-in-transit; and visibility may provide information such as key lengths, protocols, algorithms, and protocol versions that are in use. The system provides mutual authentication and rotation of keys. In addition, the system may allow removal of old or obsolete versions of encryption protocols. This may allow transition to quantum-safe computing that may leverage algorithms that may be designed to be safe from quantum cryptanalysis. The system may be utilized by computing devices having a higher computational power and computational resources as well as computing devices that have more limited computational power and computational resources. As a result, computing devices in an IoT environment that may be incapable of handling asymmetric cryptography may benefit from the mutual authentication providing rotating keys.

The system may be utilized by enterprises or users that may leverage encryption protocols such as TLS, Datagram Transport Layer Security (DTLS), IPSec, or SSH either within a single computing environment or across multiple computing environments or enterprises. In addition, the system may provide sufficient cryptoagility and visibility to provide a quantum safe environment. The system may be utilized by IoT computing devices that may be capable of implementing symmetric cryptographic algorithms but possibly unable to implement asymmetric cryptographic algorithms. In addition, the system may provide improved efficiencies related to cryptographic handshakes used in key management.

As an example, a method may include requesting, by a first computing device having a first application and a first Transport Layer Security (TLS) library, a sequence of cryptographic keys from a first agent, the sequence of cryptographic keys based on an agent key and stored in the first TLS library, requesting, by a second computing device having a second application and a second TLS library, the sequence of cryptographic keys from a second agent, the sequence of cryptographic keys based on the agent key and stored in the second TLS library, and communicating between the first application of the first computing device to the second application of the second computing device using the sequence of cryptographic keys based on the agent key.

FIG. 1 illustrates a block diagram of a cryptographic platform system 100 according to an example embodiment. The cryptographic platform system 100 may include a plurality of computing devices such as a first computing device 102 and a second computing device 104 that communicate via a communication network 106. The first computing device 102 and/or the second computing device 104 may be one or more computing devices, a virtual machine, a container, or another type of packager that may be capable of executing one or more programs or applications. The first computing device 102 may execute a first application 108 using at least one processor and the second computing device 104 may execute a second application 114 using at least one processor. In addition, the first computing device 102 may have a first TLS library 110 and the second computing device 104 may have a second TLS library 116. The first computing device 102 may have access to a first agent 112 and the second computing device 104 may have access to a second agent 118.

The cryptographic platform system 100 may provide a number of benefits including allowing enterprise computer networks to utilize and leverage encryption protocols such as TLS, DTLS, IPSec, and SSH using their own computing environment or a number of computing environments across different computing networks. Additionally, the cryptographic platform system 100 provides cryptoagility to change algorithms or protocol versions and to provide a quantum safe environment, and visibility to provide an understanding of algorithms, protocols, and other information actually used in the communication. The computing networks may utilize computing devices with minimal computing power such as Internet of Things (IoT) devices that may be capable of implementing symmetric cryptographic algorithms but are unable to implement asymmetric cryptographic algorithms. Even further, the cryptographic platform provides improvements in efficiency in cryptographic handshakes used in key management.

As shown in FIG. 1, the first application 108 may communicate with the second application 114 using a cryptographic protocol and send data that is encrypted/decrypted with cryptographic keys that may be obtained or derived from the first agent 112. In addition, the second application 114 may communicate with the first application 108 and send data that is encrypted/decrypted with cryptographic keys that may be obtained or derived from the second agent 118. As an example, the cryptographic protocol may be Secure Sockets Layer (SSL) v2, SSL v3, TLS 1.0, TLS 1.1, TLS 1.2, and TLS 1.3, among others.

In one example, the system 100 may have one or more libraries such as the first TLS library 110 and the second TLS library 116 that implement TLS. The first application 108 may interface or communicate with the first TLS library 110 using an Application Programming Interface (API) and the second application 114 may interface or communicate with the second TLS library 116 using an API. In one example, the API is identical or a superset of the aspects of the API used by TLS libraries that do not leverage the system 100 but offer TLS using a key management scheme such as a server which presents a certificate to a client and does not include agents that are separated from the respective libraries. The API may be backwardly compatible. Both the client and server trust their respective TLS libraries to implement the cryptographic communication protocol. However, the details associated with the TLS libraries are hidden from the application behind the API. Using a patch or an overwrite method, one may swap out the old TLS libraries and replace with new TLS libraries and then add agents, without changing the application where the new TLS libraries offer mutual authentication using the methods described herein.

For example, the first computing device 102 may utilize the system 100 and the first application 108 may communicate with a new, upgraded, and updated TLS library and the new TLS library may be installed as a replacement. As an example, the new TLS library may be the first TLS library 110. As long as the new TLS library uses the same API as the old TLS library, the first application 108 does not have to be modified.

As an example, the first application 108 may have access to the first TLS library 110 that obtains or derives the cryptographic keys from the first agent 112 and the second application 114 may have access to the second TLS library 116 that obtains or derives the cryptographic keys from the second agent 118. For example, the first TLS library 110 may utilize a pre-shared key such as PSK-1 and the second TLS library 116 may utilize the same PSK-1. If the first TLS library 110 gets an updated key and rotates to PSK-2, then the second TLS library also may get an updated key and rotate to PSK-2. In one example, the cryptographic keys after PSK-1 may be derived using Hashed Message Authentication Code (HMAC)-based key derivation function (HKDF) or using another method.

In a conventional solution, the first TLS library 110 would obtain its key from a key negotiation handshake that does not involve an external agent such as the first agent 112. However, according to one example, the first TLS library 110 may send a request to the first agent 110 for a key and receive a key such as PSK-1. In another example, the first TLS library 110 may send a request to the first agent 112 for a key and the first agent 112 may asynchronously overwrite the encryption key used by the first TLS library 110 by sending the PSK-1 and deriving encryption keys from PSK-1. In another example, the first TLS library 110 may obtain a pre-key such as pre-PSK-1 from the first agent 112 and derive PSK-1 from the pre-key. As an example, the first TLS library 110 may compute or determine a message digest, e.g., SHA-512, over the pre-key such as pre-PSK-1 and truncate to the first two-hundred and fifty-six bits or another length. This process may continue for PSK-2, PSK-3, . . . , PSK-n where PSK-(i+1) is SHA-512(PSK-i|pre-PSK-1) truncated to 256 bits. In other words, PSK-(i+1) is SHA-512 computed over the concatenation if PSK-i and pre-PSK-1, where the 512 bit message digest result is truncated to 256 bits.

Because the first TLS library 110 and the second TLS library 116 have identical copies of cryptographic keys supplied by agents, the communication has mutual authentication once the respective libraries mutually demonstrate possession of those keys. Thus, the system 100 provides mTLS or mutually authenticated TLS. In a further example, one or more of the first computing device 102 and the second computing device 104 may be a reverse proxy, e.g., a web server, or a forward proxy.

In one example, the first agent 112 and the second agent 118 may agree upon a sequence of cryptographic keys using authenticated key agreement. The key agreement may be associated with Diffie-Hellman, Quantum-Safe key agreement such as Supersingular Isogeny Key Encapsulation (SIKE), Supersingular Isogeny Diffie-Hellman Key Exchange (SIDH), or Post-Quantum Diffie-Hellman (PQDH), among others. Each of the first agent 112 and the second agent may have access to a secret key such as an agent key. The first agent 112 and the second agent 118 may agree upon a sequence of keys such as PSK-1, PSK-2, . . . PSK-n while mutually authenticating each other using the agent key.

As an example, the first agent 112 and the second agent 118 may utilize a mutually authenticated and encrypted channel. The first agent 112 may have a first certificate and an associated private key. The second agent 118 may have a third certificate and an associated private key. The first agent 112 and the second agent 118 may communicate using a TLS channel and each agent may validate the other agent's certificate including the expected Distinguished Name. The certificate validation can be in accordance with the TLS specification.

As another example, the first agent 112 and the second agent 118 may build a TLS connection by mutually authenticating one another and using a shared secret password. The shared secret password may be an agent key. Each of the first agent 112 and the second agent 118 may mutually authenticate to one another using the Socialist Millionaire Protocol (SMP), among other methodologies.

In a further example, the first agent 112 and the second agent 118 may communicate with a common root distributor and the common root distributor may provide the agent key to each agent.

In one example, the first agent 112 and the first TLS library 110 may reside on the first computing device 102. In another example, the first agent 112 and the first TLS library 110 may be on different computing devices. In another example, the first agent 112 and the first TLS library 110 may communicate using a TLS encrypted channel, an SSH encrypted channel, an IPSec encrypted channel, a protected network or virtual local area network (VLAN) that may be protected by a firewall or a Network Secure Group. In another example, the first agent 112 may communicate with a plurality of TLS libraries. The first TLS library 110 does not receive a PSK provided to any of the other plurality of TLS libraries with which the first agent 112 communicates. In another example, the first TLS library 110 and a plurality of other TLS libraries with which the first agent 112 communicates receive identical PSKs.

The first application 108 and the second application 114 may utilize an encryption/decryption algorithm such as Advanced Encryption Standard (AES) or Rijndael using a 256-bit key or Triple-Data Encryption Standard (TDES), among others. TDES is also known as Triple Data Encryption Algorithm (TDEA or Triple DEA) Each of the first TLS library 110 and the second TLS library 116 may be associated with or derived from OpenSSL.

As an example, the first application 108 may not be modified but data communicated from the first application may be encrypted/decrypted with keys derived from the first agent 112. In a similar manner, the second application 114 may use the second TLS library 116 which obtains or derives the keys derived from the second agent 118. The first application 108 and the second application 114 may communicate using the TLS protocol with keys derived by the agents as long as the respective agents provide the same key. As an example, if the first TLS library 110 receives an updated key PSK-2 from the first agent 112, then the second TLS library 116 is to obtain an updated key, PSK-2 from the second agent 118. One example method of derivation used by the first TLS library 110 and the second TLS library 116 is to use HKDF to generate additional keys and then mutually prove possession of one of the generated keys. Another example method of derivation is to use DHE-PSK to agree on further keys authenticated based upon on or more of the sequence of PSKs obtained from the respective agents.

As another example, the first application 108 and the second application 114 may communicate using the DTLS protocol where the keys are supplied or derived by agents. In another example, the first application 108 and the second application 114 may utilize AES with a 256-bit key. In another example, the first application 108 and the second application 114 may utilize Triple-DES. In another example, the first TLS library 110 may be or may not be derived from OpenSSL.

In one example, the first TLS library 110 and/or the second TLS library 116 may reside in a reverse proxy or a web server. The first application 108 may utilize the first TLS library 110 with keys obtained or derived from the first agent 112. The first application 108 may communicate with a web server, e.g., the second computing device 104, or another computing device using the respective TLS libraries with keys obtained or derived from agents such as the first agent 112 and/or the second agent 118. As an example, the web server may communicate with the first application 108 over the communication network 106. The first application 108 may send TLS encrypted traffic to the web server and the web server may use its TLS library to decrypt and provide cleartext data to an application executed by the web server. However, the web server also may communicate over an independent TLS, DTLS, IPSec, SSH, or cleartext channel.

In another example, the first application 108 may communicate with another application using a forward proxy. As an example, the first application 108 may provide data to the forward proxy and the forward proxy may communicate with another application such as the second application 114. The forward proxy may communicate with the second application 114 or other application over a TLS encryption channel using keys obtained or derived from the first agent 112 and the second agent 118, among other agents.

The first application 108 may communicate to the forward proxy and the forward proxy may communicate over the TLS encrypted channel to a web server such that the keys are derived or obtained from the agents. The web server may communicate with the first application 108. The first application 108 and the forward proxy may reside on a same computing device, e.g., the first computing device 102. In addition, the web server and the second application 114 may reside on a same computing device, e.g., the second computing device 104.

The first agent 112 and the second agent 118 may communicate with one another in order to agree on keys and/or for other reasons. As an example, the first agent 112 and the second agent 118 may operate a sequence of key agreement protocols to agree upon keys PSK-1, PSK-2 . . . PSK-n. The first agent 112 and the second agent 118 may supply the keys to the first TLS library 110 and the second TLS library 116, respectively. In one example, the key agreement method may be Diffie-Hellman. An adversary between the agents may monitor the communication without discovering the agreed-upon key. In other examples, the key agreement may be quantum safe and protected from cryptoanalysis attack on a quantum computing device. As an example, the quantum-safe key agreement algorithm may be SIKE, SIDN, or PQDH, among others.

As an example, the first agent 112 and the second agent 118 may secure their communication using a mutually encrypted channel. The first agent 112 may have a first certificate and a first private key and the second agent 118 may have a second certificate and a second private key. The first agent 112 and the second agent 118 may communicate over a TLS channel and each agent may validate the other agent's certificate. By mutually authenticating the other agent's certificate, each agent can ensure that the TLS link is mutually authenticated. The first agent 112 and the second agent 118 can then operate a key agreement protocol, e.g., Diffie-Hellman, one or more times to generate a sequence such as PSK-1, PSK-2 . . . PSK-n.

The first agent 112 and the second agent 118 may agree upon the sequence of keys using authenticated key agreement. In authenticated key agreement, the first agent 112 and the second agent 118 may each have access to a secret key such as Agent-Key. The first agent 112 and the second agent 118 may agree upon a sequence of keys, e.g., PSK-1, PSK-2 . . . PSK-n while mutually authenticating each other using the Agent-Key. No adversary is able to discover the sequence of keys by reading or modifying the data communicated between the first agent 112 and the second agent 118. In addition, the adversary is unable to fool the first agent 112 or the second agent 118 into participating in key agreement because the adversary does not have the Agent-Key.

As an example, the first agent 112 and the second agent 118 may build a TLS connection using methodologies discussed in RFC 5054, e.g., Using the Secure Remote Password (SRP) Protocol for TLS Authentication. This may include use of a shared secret password. The shared secret password may be the Agent-Key. Once the mutually authenticated TLS connection is created, the first agent 112 and the second agent 118 may agree upon PSKs using a key agreement method such as Diffie-Hellman, or another method. The first agent 112 and the second agent 118 may agree upon a sequence of PSKs such as PSK-1 through PSK-n by running key agreement multiple times over the TLS connection as provided in RFC 5054. In one example, the cipher suite may be associated with TLS_SRP_SHA_WITH_AES_256_CBC_SHA. In another example, the cipher suite may be TLS_SRP_SHA_DSS_WITH_AES_256_CBC_SHA.

RFC 5054 indicates that respective peers have knowledge of a common secret password, e.g., Agent-Key. In one example, Agent-Key is compiled into the first agent 112 and/or the second agent 118. In another example, the Agent-Key may be obtained from a file in a local file system associated with the first agent 112 and/or the second agent 118.

The first agent 112 and the second agent 118 may have the pre-distributed secret value, e.g., Agent-Key and they may mutually authenticate with one another using the Socialist Millionaire Protocol (SMP). SMP includes two Diffie-Hellman exchanges. Using a shared value from one of the Diffie-Hellman exchanges as the shared password, RFC 5054 methodologies may be used to create an authenticated TLS session between the first agent 112 and the second agent 118. SMP is a zero knowledge proof and cryptographic method with multiple advantages. As is known, in a zero knowledge proof, only the parties may learn a binary value indicating whether or not to share the same pre-distributed secret.

As another example, the first agent 112 and the second agent 118 may have a pre-distributed secret value, e.g., Agent-Key. The first agent 112 and the second agent 118 may mutually authenticate with one another using methodologies discussed in RFC 4279. In an example, the first agent 112 and the second agent 118 may use DHE_PSK. This may provide secure authentication between peers and may also provide a shared value that would not be known to an eavesdropper. In one example, the shared value is a cryptographic key shared between the peers. In another example, one or more cryptographic keys may be derived and known by the peers and may be used to encrypt/decrypt.

The first computing device 102 and/or the second computing device 104 may be an IoT device. An IoT device may lack capacity to effectively handle asymmetric cryptographic operations. However, the first TLS library 110 and the second TLS library 116 may utilize symmetric encryption with the PSKs or keys derived from the PSKs and as a result, the IoT devices may avoid use of asymmetric cryptography and its drawbacks and shortcomings.

Figure 3:
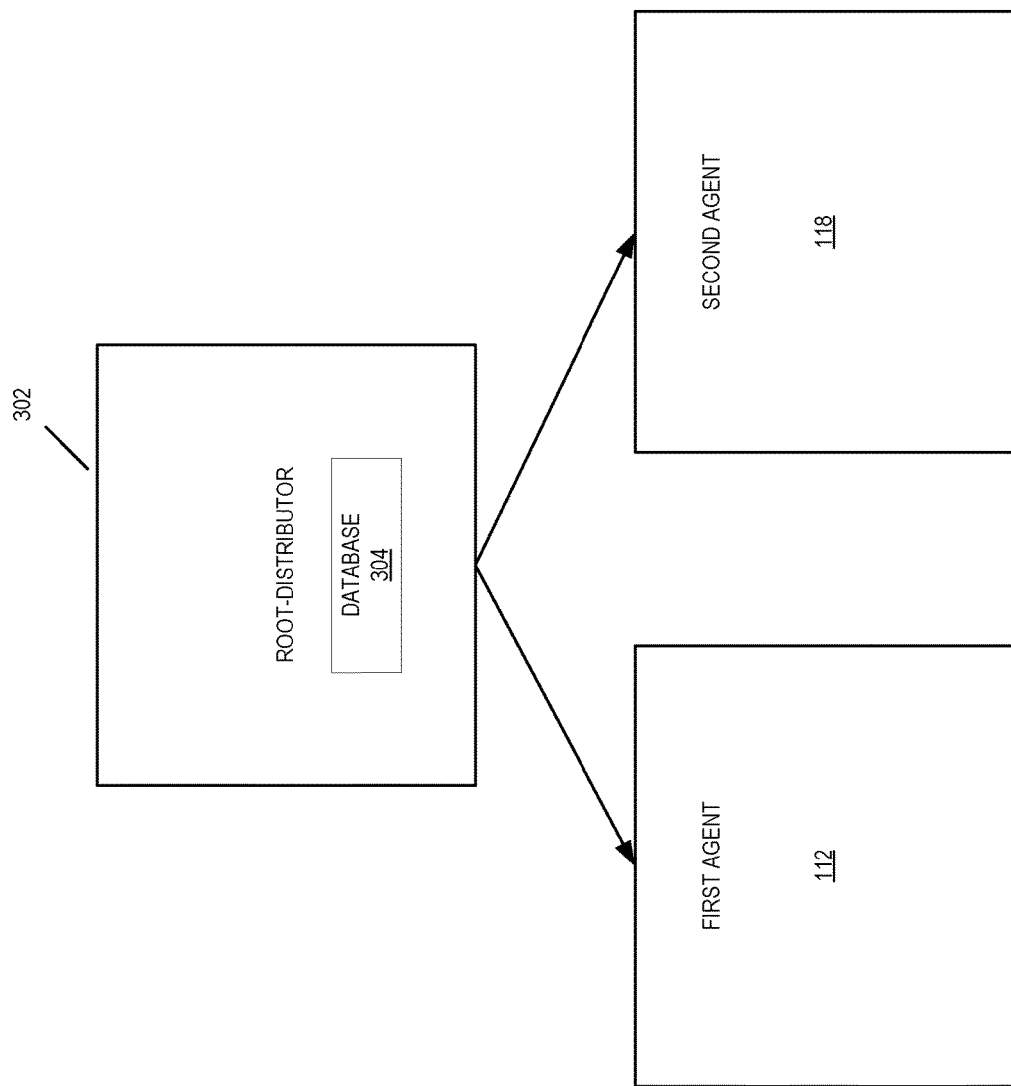
FIG. 3 is a block diagram of a root-distributor associated with the cryptographic platform system according to an example of the instant disclosure.

In one example, and as shown in FIG. 3, each of the first agent 112 and the second agent 118 may communicate with a common root-distributor 302. As an example, the common root-distributor 302 may communicate with a plurality of agents including the first agent 112 and the second agent 118, among other agents. Each agent may communicate with the root-distributor 302 using the TLS protocol and the root-distributor 302 may provide the agents with the Agent-Key.

Each agent may have local authentication credentials such that no two respective agents have the same authentication credentials. Each agent may communicate with the root-distributor 302 and may authenticate using its local authentication credentials.

In one example, the local authentication credential may be a string of 64 hex digits that represent 256 random bits. The root-distributor 302 may manage a database that may hold credentials used to validate. For example, when the agent first connects to the root-distributor 302, the agent may provide its local authentication credential and the root-distributor 302 may consult a database record for the agent to validate the credential. The agent may store its local authentication credential in a file to be read when the agent starts up. In another example, the agent may store the local authentication credential in an encrypted file to be read when the agent starts up, where the decryption key may be hardcoded into the agent. In another example, the agent may store the local authentication credential in a key vault file to be read when the agent starts up. Alternatively, the agent may authenticate with a private key associated with a client-side certificate using TLS and the root-distributor 302 may validate with a corresponding public certificate.

The root-distributor 302 may authorize connections as noted in Table One below. As shown in the table, an agent A may communicate with an agent B. In addition, agent A and an agent C may communicate. However, agent B cannot communicate with agent C because there is not a record in the table that indicates that agent B can communicate with agent C. The root-distributor 302 may provide an Agent-Key D to both agent A and agent B. In addition, the root-distributor 302 may provide an Agent-Key E to both agent A and agent C. The Agent-Key D and Agent-Key E are names of the Agent-Keys and not values. Their respective values may be 256 bit values represented by hex strings.

TABLE ONE

| Agent A | Agent B |
|---------|---------|
| Agent A | Agent C |

The root-distributor 302 may enforce authorization by offering the appropriate Agent-Key D or Agent-Key E. As an example, agent A may receive the Agent-Key D to communicate with agent B. Alternatively, agent A may receive Agent-Key E to communicate with agent C. However, agent B may not receive Agent-Key E to communicate with agent C. By determining when to offer shared keys to the respective agents, the root-distributor 302 may segregate the underlying network of TLS communication pairs.

As an example, each agent 112 and agent 118 may obtain a respective local authentication key. The respective connections between the agents to the root-distributor 302 may be encrypted using TLS where the root-distributor is the server. The TLS cipher suite may leverage a certificate and each of the agents 112 and 118 may validate the server's certificate, e.g., certificate pinning.

Using the TLS connection to the root-distributor 302, each of the first agent 112 and the second agent 118 may authenticate with its respective local authentication key. The root-distributor 302 has a database 304 of local authentication keys for each agent. The root-distributor 302 may look up the agent in the database 304 and check that the local authentication key is correct.

In one example, the agent may authenticate to the root-distributor 302 using a private key associated with a client-side certificate and the root-distributor 302 may validate with a corresponding public key that may be found in the agent's database record. The root-distributor 302 may reference the database 304 having connections that lists pairs of agents. If the root-distributor 302 agrees that a connection is to be established between the pairs of agents, then the pair may appear in a record in the database 304. If the agent 112 and the agent 118 are represented in the database 304, the root-distributor 302 may use a pseudo-random number generator to create a unique key. In another example, the root-distributor 302 may use a true random number generator to create a unique key. The root-distributor 302 may provide the unique key to each of the first agent 112 and the second agent 118, respectively.

The first agent 112 and the second agent 118 may use RFC 5054 to create a TLS connection authenticated using the unique key as the shared secret password. Within the connection, the first agent 112 and the second agent 118 run key agreement to create PSK-1. The first TLS library 110 may obtain a sequence of keys PSK-1 . . . PSK-n from the first agent 112 and the second TLS library 116 may obtain a sequence of keys PSK-1 . . . PSK-n from the second agent 118. As a result, the first application 112 may open a TLS communication channel to the second application 114. The first TLS library 110 and the second TLS library 116 may each overwrite the encryption key with PSK-1 . . . PSK-n and communication between the first application 112 and the second application 114 may be encrypted using PSK-1 . . . PSK-n or keys derived from each key in the sequence.

Some asymmetric cryptographic algorithms may be subject to attack by quantum cryptoanalysis (e.g., an attack performed by a quantum cryptographic machine). However, strong symmetric cryptographic algorithms are not known to be subject to attack by quantum cryptoanalysis. When using quantum-safe key agreement combined with exclusive use of symmetric algorithms such as AES 256, the method may be quantum-safe. As a result, the system may provide authentication, key management, and data encryption that may be configured to be quantum-safe.

Additionally, the system protects against a record-now-decrypt-later (RNDL) attack. In a RNDL attack, the adversary may record the encrypted material and later attempt to determine information associated with the encrypted material with additional computational resources or power, e.g., record material to be later attacked using quantum computing. This may allow attacks to be performed years later using quantum computing devices as they increase in capability. However, since data encrypted with a symmetric algorithm is not known to be vulnerable to quantum cryptoattacks, the adversary is unable to attack directly.

The adversary may additionally record the key management methods in the hope to break a key during a key management phase and then use the key to decrypt the data. However, perfect forward secrecy may be used within TLS to limit the attack surface of a RNDL attack on key management. Thus, perfect forward secrecy may ensure that a symmetric key used to encrypt data is not derived from previously recorded or future to-be recorded keys. Thus, as a defensive measure, key agreement using perfect forward secrecy may be quantum safe using SIKE, SIDH, or PQDH. The first agent 112 and the second agent 118 may use a quantum safe key agreement algorithm to agree on the keys PSK-1 . . . PSK-n.

Figure 2:
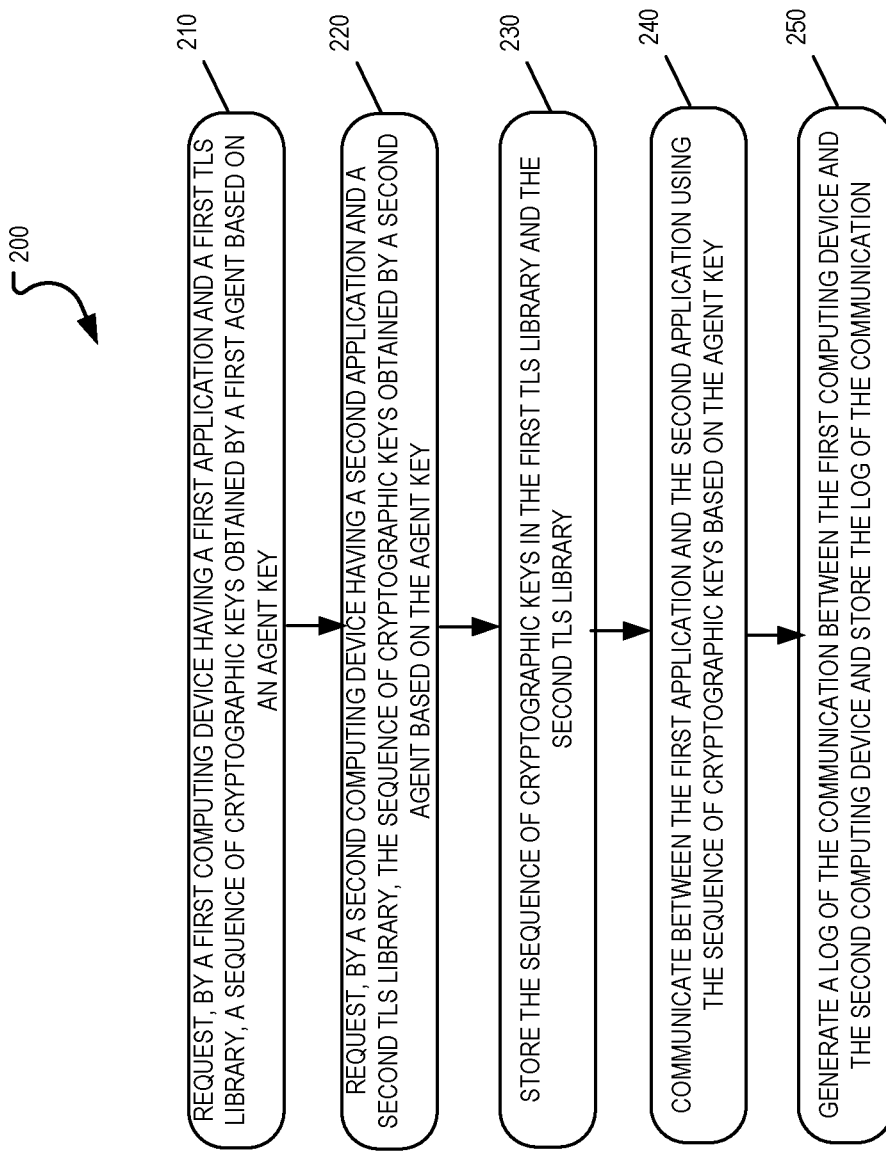
FIG. 2 is a flowchart of a method for communicating data between a first application and a second application that is encrypted/decrypted using keys derived by an agent according to an example of the instant disclosure.

FIG. 2 illustrates an example method 200 for communicating data between the first application 108 and the second application 114 that is encrypted/decrypted using keys derived by an agent, each application having access to a TLS library. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes requesting, by a first computing device 102 having a first application 108 and a first TLS library 110, a sequence of cryptographic keys obtained by a first agent 112, the sequence of cryptographic keys based on an agent key and provided by the first agent to the first TLS library 110 at block 210. In one example, each cryptographic key in the sequence of cryptographic keys is two-hundred and fifty-six bits in length, among other lengths. The first application 108 may interface with the first TLS library 110 using an Application Programming Interface (API).

As an example, the first agent 112 and the second agent 118 may create a TLS connection using a shared secret password and generate a first cryptographic key in the sequence of cryptographic keys. As another example, the first agent 112 may derive a first cryptographic key of the sequence of cryptographic keys by computing a message digest over the first cryptographic key and truncating to a first two-hundred and fifty-six bits or another length.

As noted above, at least one of the first computing device 102 and the second computing device 104 may be an Internet of things (IoT) device. In another example, the first computing device 102 is a client computing device and the second computing device 104 is a server computing device. In addition, in some examples, at least one of the first TLS library 110 and the second TLS library 116 may be associated with TLS. Alternatively or in addition, the first TLS library 110 and the second TLS library 116 may implement IPSec.

According to some examples, the method includes requesting, by a second computing device 104 having a second application 114 and a second TLS library 116, the sequence of cryptographic keys obtained by a second agent 118, the sequence of cryptographic keys based on the agent key and provided by the second agent to the second TLS library 116 at block 220.

The first agent 112 and the second agent 118 may operate a key agreement protocol to generate the sequence of cryptographic keys. In another example, the first agent 112 has a first public key and a first private key that are mathematically related with the first public key residing in a first certificate. The first TLS library 110 has a second public key and a second private key that are mathematically related with the second public key residing in a second certificate. The second agent 118 has a third public key and a third private key which are mathematically related with the third public key residing in a third certificate.

The first agent 112 is given the second certificate and the first TLS library 110 is given the first certificate. The first agent 112 is given the third certificate and the second agent 118 is given the first certificate. The first TLS library 110 and the first agent 112 communicate over mutually authenticated TLS using AES256 as the symmetric encryption algorithm. The first agent 112 and the second agent 118 communicate over mutually authenticated TLS using AES256 as the symmetric encryption algorithm. In another example, the first TLS library 110 and the first agent 112 can reside on the same virtual machine and communicate over a one-way authenticated TLS using AES256 as the symmetric algorithm wherein the first agent 112 may hold the private key associated the second certificate. In this example, the TLS library 110 may authenticate the identity of the first agent 112 using the second certificate in the one-way TLS communication. The first agent 112 can make it difficult for an adversary to impersonate the first TLS library 110 by checking that the first agent 112 and the first TLS library 110 reside on the same machine or computing device. This check may be performed by forcing the first TLS library 110 and the first agent 112 to communicate using shared memory where the shared memory is not shared with another machine.

In another example, the first agent 112 and the first TLS library 110 communicate with information encrypted with a first key. As another example, the first agent 112 has a first public key and the first TLS library 110 communicates to the first agent 112 using information encrypted with the first public key. In another example, the first agent 112 has a first public key and a first private key pair associated with a first certificate and the first TLS library 110 communicates to the first agent 112 using information encrypted with the first public key. Additionally, the first TLS library 110 may have a key which it uses to authenticate to the first agent 112.

According to some examples, the first agent 112 stores the first private key in a file in the local file system upon which first agent 112 resides. First agent 112 encrypts the file using a symmetric key known to first agent 112. According to some examples, the first agent 112 uses White Box cryptography to implement AES256 encryption as the method of symmetric encryption of the first private key. According to some examples, the first agent 112 periodically changes its public/private key pair and re-encrypts the new private key; and the first agent 112 embeds the corresponding public key in a new certificate which is provided to the second agent 118. Additionally, the second agent 112 may also protect its private key using similar methods.

The system 100 provides a way of upgrading one-way TLS to two-way TLS without having to refactor an associated application such as application 102 and 104. The first application 108 may rely upon the first TLS library 110 because the first application 108 and the first TLS library 110 are linked into the same address space of the first computing device 102. The first TLS library 110 may establish a mutually authenticated connection to the first agent 112. The first agent 112 mutually authenticates the second agent 118. As a result, the first application 108 transitively trusts the second agent 118. The same may be true in reverse: the second application 114 transitively trusts the first agent 112.

Also conventionally, TLS combines key management and payload encryption into the TLS library. However, the system 100 separates TLS key management into a separate process done by the agent 112 or agent 118.

According to some examples, the method includes the first agent 112 providing the sequence of cryptographic keys to the first TLS library 110 and the second agent 118 providing the sequence of cryptographic keys to the second TLS library 116. The method also includes storing the sequence of cryptographic keys in the first TLS library 110 and the second TLS library 116 at block 230. In some examples, the first agent 112 and the second agent 118 mutually authenticate using a sequence of pre-shared keys based upon the Socialist Millionaire Protocol (SMP) or DHE-PSK, among other ways.

According to some examples, the method includes communicating between the first application 108 of the first computing device 102 to the second application 114 of the second computing device 104 using the sequence of cryptographic keys based on the agent key at block 240. In addition, a first cryptographic key in the sequence of cryptographic keys may rotate to a second cryptographic key in the sequence of cryptographic keys after a particular period of time, e.g., one hour, one day, or another period of time. The method may include communicating data that is encrypted with one key of the sequence of cryptographic keys from the first application 108 to the second application 114 using a communication channel. In addition, the method may include decrypting the data using the one key of the sequence of cryptographic keys by the second application 114.

According to some examples, the method includes generating a log of the communication between the first computing device 102 and the second computing device 104 and sending the log of the communication by the first TLS library 110 to the first agent 112 through a mutually authenticated TLS channel and/or sending a log of the communication by the second TLS library 116 to the second agent 118 through a mutually authenticated TLS channel at block 250. In some examples, individual log records may include any or all of the following information that was used in the communication: cryptographic algorithm, cryptographic key length, identity of the respective agents, time and date, IP addresses of the respective agents, IP addresses, version of the respective TLS library, version of protocol that was actually negotiated, e.g., TLS 1.0, TLS 1.1, TLS 1.2, TLS 1.3, etc., and a unique name of the leveraged PSK.

According to some examples, the method includes decrypting the data using the one key of the sequence of cryptographic keys by the second application 114. In addition, a first cryptographic key in the sequence of cryptographic keys may rotate to a second cryptographic key in the sequence of cryptographic keys after a first hour and the second cryptographic key in the sequence of cryptographic keys may rotate to a third cryptographic key in the sequence of cryptographic keys after a second hour. This may continue until reaching an nth key in the sequence of cryptographic keys.

According to some examples, the method includes displaying a graphical user interface that shows the log of the communication between the first computing device 102 and the second computing device 104. The log may be stored in the first agent 112, the second agent 118, or in another location, or transmitted to a common location by a plurality of agents. Examples of information that may be included within each record in the log may be algorithm, key length, time and date of the transmission, IP address of computing device 102 and/or 104, protocol version, and an independent identifier of the PSK used by each respective agent 112 and 118 to establish the sequence of keys.

In one example, the system 100 may provide a method for upgrading the system where a second application authenticates the identity of a first application to the system where the applications mutually authenticate whereby neither the first nor second application change. The cryptographic keys used to mutually authenticate may be encrypted.

In addition, the system 100 may provide a user interface that can display a log record of at least one of algorithm, key length, time and date of the transmission, IP address of computing device 102 and/or 104, and an independent identifier of the PSK used by each respective agent 112 and 118 to establish the sequence of keys.

In another example, the system 100 may provide a method for upgrading the system where the first application 108 links with the first library 110 and the first library communicates with the first agent 112. In addition, the second application 114 links with the second library 116 and the second library communicates with the second agent 118. As a result, the agents may mutually authenticate with cryptographic keys and the agents encrypt the cryptographic keys.

In another example, the system 100 may provide a method for upgrading the system where the first application 108 links with the first library 110 allowing the first application 108 and first library 110 to communicate with shared memory where the memory is not shared with a different machine; and the first library communicates with the first agent 112. The second application 114 links with the second library 116 and the second library communicates with the second agent 118. The agents produce log records that are visible through an interface such as a graphical user interface.

In another example, the system 100 may provide a method for upgrading the system where the first application 108 links with the first library 110 and the first library communicates with the first agent 112. The first application 108 may trust the first library 110 because they are directly linked. In addition, the first library 110 may trusts the first agent 112 because the first agent 112 authenticates itself to the first library 110. As a result, the first application communicates with the second application 114 and validates the second application 114 transitively because the first application 108 trusts the first library 110 and the first library trusts the first agent 112 and the first agent 112 trusts the second agent 118 which is trusted to represent the identity of the second library 116.

Agility

Other Protocols

The system 100 and key management methods may be used for protocols other than TLS. As an example, the first TLS library 110 and the second TLS library 114 may implement IPSec. The shared keys that IPSec uses to mutually authenticate may be PSK-1 . . . PSK-n. In one example, the first TLS library 110 and the second TLS library 114 may implement DTLS. The shared keys that use DTLS to mutually authenticate may be PSK-1 . . . PSK-n.

When the first TLS library 110 and the first agent 112 are on different computing devices, an adversary may attempt a man-in-the-middle attack. The first TLS library 110 and the first agent 112 may be assumed to have a pre-configured shared key. The first TLS library 110 and the first agent 112 may mutually authenticate to one another using RFC 4279, e.g., Pre-Shared Key Ciphersuites for TLS, using the shared key. As an example, the first TLS library 110 and the first agent 112 may use DHE-PSK.

RFC 4279 not only provides secure authentication of peers, but also provides a shared value that would not be known to an eavesdropper. The shared value may be a cryptographic key shared between the peers. The first agent 112 may encrypt the sequence PSK-1 . . . PSK-n using the shared value and provide the sequence to the first TLS library 110. In one example, the first agent 112 and the first TLS library 110 may repeat the process by running RFC 4279 and sending additional sequences of PSKs such that they may over time communicate a plurality of sequences of PSKs. As an example, prior to repeating the process of running RFC 4279, the first agent 112 and the first TLS library 110 may reserve one of the PSKs in the sequence, e.g., PSK-n, to be used as a replacement shared value for the shared value when communicating the next sequence PSK-1-2 . . . PSK-n-2. When using PSK-n in this way, it may be reserved and used for no other purpose.

The first agent 112 and the first TLS library 110 may be assumed to have a pre-configured shared key and may mutually authenticate using the Socialist Millionaire Protocol (SMP) which is a zero knowledge proof. Using a shared key obtained within the execution of a key agreement within SMP, the first agent 112 and the first TLS library 110 may have a shared value to use. In another example, the shared key obtained within the execution of a key agreement within SMP may be suitable for use as a pre-configured key for use in RFC 4279 to create a shared session key.

By using a zero knowledge proof to authenticate the first agent 112 and the first TLS library 110, this provides security advantages between the only information revealed by SMP is whether the parties may mutually authenticate. This may provide out-of-band provisioning of PSK-1 . . . PSK-n. Thus, when the first agent 112 and the first TLS library 110 communicate using TLS or another encryption protocol, the communication may only utilize symmetric algorithms. This provides efficiencies over asymmetric algorithms. The zero knowledge proof may be quantum safe and it may be MatRiCT, among others. MatRiCT is an efficient RingCT protocol that may be used for transactions that provides security based on "post-quantum" computing.

The first agent 112 and the first TLS library 110 may have a pre-configured authentication key. The first agent 112 and the first TLS library 110 may run a quantum safe key agreement to produce the authentication key. The first agent 112 and the first TLS library 110 may execute a quantum safe knowledge proof to demonstrate knowledge of the authentication key where each message in the communication may be encrypted using the authentication key using AES256. The agent 112 may then securely communicate PSK-1 . . . PSK-n to the TLS library 110 encrypted with the authentication key using AES256. This may allow the agent 112 to provide PSK-1 . . . PSK-n using quantum safe methods.

Certificates

Figure 4:
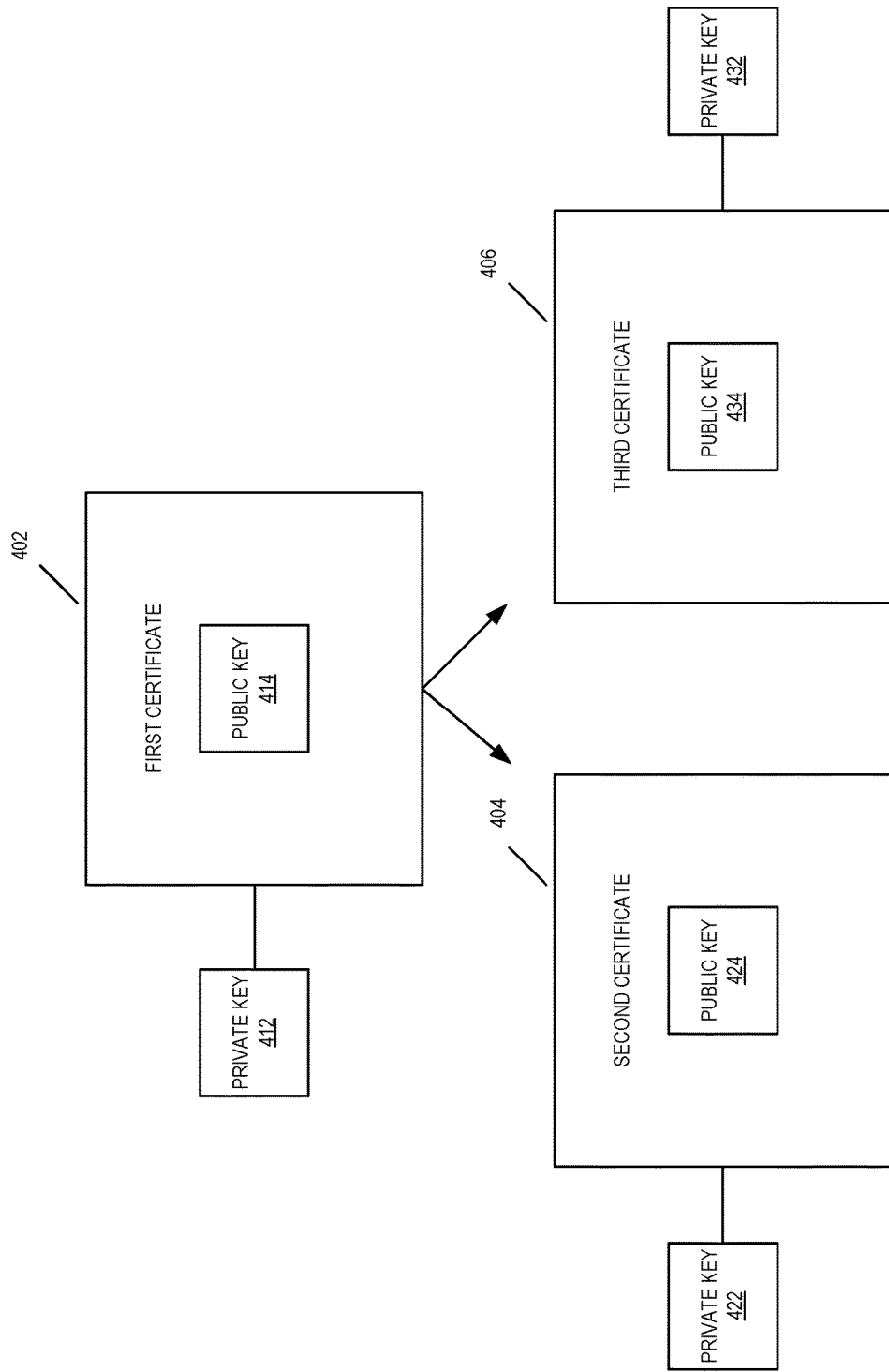
FIG. 4 is a block diagram of a certificate hierarchy associated with the cryptographic platform system according to an example of the instant disclosure.

Asymmetric cryptographic solutions may leverage and use public/private keys. As an example, the public/private key pairs may be used in the RSA (Rivest-Shamir-Adleman) algorithm with 2048 bits. As an example, each arrow in FIG. 4 may depict and represent a digital signature and a line may indicate a mathematical correspondence. As an example, the second certificate 404 and the third certificate 406 are each digitally signed by the first private key 412.

As an example, the first agent 112 and the second agent 118 may create a mutually authenticated TLS channel. The first agent 112 has a public key 424 and a corresponding private key 422. The public key 424 is in a certificate 404. The second agent 118 has a public key 434 and a corresponding private key 432. The public key 434 is in a certificate 406. A central Certificate Authority (CA) has its own public 414/private key pair 412 in certificate 402. The first agent 112 and second agent 118 each have the CA certificate 402 embedded in their source code. During the TLS handshake when first agent 112 and second agent 118 set up the TLS connection, each agent receives the other agent's certificate. Each agent validates the certificate by validating the signature of the certificate against the public key embedded in the certificate 402 and validating that the public key is the one that is embedded in source code. During the context of the TLS handshake each respective agent executes a digital signature. Second agent 118 validates the first agent's digital signature against public key 424 in certificate 404. First agent 112 validates the second agent's digital signature against public key 434 in certificate 406. Over the mutually authenticated TLS connection, the respective agents may execute Diffie-Hellman or a quantum-safe algorithm to agree upon a Pre-Shared Key. From this Pre-Shared Key, they each run HKDF to generate a sequence of mutually agreed PSKs.

Subsequent TLS connections between the first TLS library 110 and the second TLS library 116 may use certificate-based authentication in order to create a mutually authenticated TLS connection. As an example, the first TLS library 110 may initiate a TLS connection and the second TLS library 116 may mandate mutual authentication using certificates in the TLS handshake. Next, the first TLS library 110 may validate that the server's certificate is signed by a root key and validate that the root certificate has the first public key 414. The second TLS library 116 may validate that the client's certificate is signed by a root key. The second TLS library 116 may validate that the root certificate has the first public key 414.

Thus, agents may establish mutual authentication using either PSKs (e.g., shared symmetric keys using algorithms such as AES-256) or asymmetric keys. In some examples, the shared symmetric key has advantages in use. For example, the shared symmetric keys may be easier to rotate and may provide use with quantum-safe algorithms, operate on computing devices with limited computational power such as IoT devices, and provide more efficient TLS because the asymmetric operations may not slow down establishing connections.

As another example, the first TLS library 110 and the second TLS library 116 may implement the SSH protocol. SSH permits public key-based authentication. As an example, the shared keys PSK-1 . . . PSK-n may be 256 bits in length and they may be used with the AES-256 algorithm.

The PSKs may be pre-shared keys. In addition, the PSK-1 . . . PSK-n may be used with the Triple-DES algorithm.

Cryptoagility

The National Institute of Technology and Standards (NIST) and other recognized organizations may sometimes uncover research that allows approval of cryptographic algorithms that may later be deprecated. When deprecated, improved cryptographic algorithms may be substituted. The system 100 may separate the application from the TLS library, agents, and root-distributor 302 as discussed herein. Thus, this may allow them to be upgraded or replaced without modifying the application. If the TLS library, agent, or root-distributor is determined to use deprecated cryptographic algorithms, they could be replaced without modifying the application. This provides cryptoagility because it allows for cryptographic refactoring without modifying the application. Cryptoagility is an increasingly important property associated with quantum cryptography and quantum crypto-analysis because quantum safe algorithms may be cumbersome.

Key Rotation

Key rotation provides the ways that a TLS library may rotate from one key to another key. Key rotation is an important defensive measure. As an example, if an adversary were to discover a key, the adversary would only have an advantage while the key is in use.

As an example, the first agent 112 may provide a plurality of PSKs to the first TLS library 110, each PSK having a unique name. In addition, the second agent 118 may provide a plurality of PSKs to the second TLS library 116, each PSK having a unique name. In other words, the first TLS library 110 and the second TLS library 116 may each refer to keys having a same name. When the first TLS library 110 encrypts a TLS packet, the first TLS library 110 may provide a key's name as a hint in a packet header that may indicate the PSK used to encrypt. When the second TLS library 116 decrypts the packet, the second TLS library 116 may use the hint to determine the key to use to decrypt.

In the opposite direction, the second TLS library 116 may encrypt and provide a hint and the first TLS library 110 may decrypt with the key using the hint. By shifting the key and the hint, the TLS libraries may have the opportunity to rotate keys. For example, each library may have twenty-four keys. The TLS libraries could use PSK-1 for a first hour, PSK-for a second hour, and so on. As a result, the TLS libraries could communicate for an entire day using a particular key for an hour and then never again using the particular key. If an adversary were to compromise a key, the advantage would be lost quickly when the key is discarded. As an example, the agents may provide a sequence of keys to the TLS libraries and periodically offer a new sequence of keys. Thus, the TLS libraries are able to continue to rotate keys. Traditional approaches may stop and restart a server or application when loading rotated authentication keys. However, the system 100 does not require stopping or restarting of a server and is on-the-fly.

In another example, the first TLS library 110 may select a key and a corresponding hint at the beginning of a session and the session may last longer than a period of rotation with the key. The TLS library 110 may choose a new key each hour. In this example, the first TLS library 110 may choose the PSK-1 and open a TLS session with a peer that may last two hours or one hundred and twenty minutes. The PSK-1 may be the encryption/decryption key for the two hours. However, if the first TLS library 110 opens a second session sixty-one minutes after the first session, then the second session's encryption/decryption key may be PSK-2.

Efficient Key Agreement

According to the system 100 herein, implementing key agreement may be accomplished efficiently. In one example, multiple keys in a sequence may be agreed upon in a batch. As an example, PSK-1 . . . PSK-n may be 256 bit keys. The key agreement algorithm may agree upon 1024 bit keys. Key agreement of a single 1024 bit key may create four 256 bit keys. A first 256 bit key may be first 256 bits of the 1024 bit key, a second 256 bit key may be the second 256 bits of the 1024 bit key, a third 256 bit key may be the third 256 bits of the 1024 bit key, and a fourth 256 bit key may be the fourth 256 bits of the 1024 bit key. Other alternatives are possible. Key agreement of a 2048 bit key can create eight 256 bit keys.

Monitoring and Self-Healing

The first TLS library 110 may regularly collect information and communicate to the first agent 112. The information may include logs of transmissions, logs of names of PSKs received, algorithms used to encrypt/decrypt application data and the key length, an IP address of a peer node or computing device involved in encrypted communication, a date and time of an operation and communication session, the log of the actual TLS version used, and information about an installed TLS library software version. The first agent 112 may communicate the information to the root-distributor 302 or other destination. The root-distributor 302 may authorize and authenticate both APIs and graphical user interfaces (GUIs). Using the API or a GUI, the root-distributor may provide the information received from one or more agents. Administrators may use this information to monitor cryptographic health of a system.

As an example, the root-distributor 302 may obtain information and determine that a particular connection is using a TLS protocol version that was installed but not used in a last n days. The root-distributor 302 may determine that one or more peers may communicate with the first TLS library 110 using TLS version 1.2 However, the root-distributor 302 may determine that the first TLS library 110 has versions 1.0 and 1.1 installed. The root-distributor 302 may send a "STOP TLS 1.0 and TLS 1.1" message to the first agent 112. The first agent 112 may provision the first TLS library 110 configuration to prohibit use of TLS 1.0 and TLS 1.1 By sending the "STOP" messages, the root-distributor 302 is able to implement self-healing for cryptographic hygiene. Conventionally, administrators were to manually monitor each connection and uninstall old protocol versions. However, the system is able to automatically configure each TLS library to prohibit old protocol versions. Additionally, the root-distributor 302 is able to determine which TLS libraries have received the "STOP" message. This may allow an enterprise to remove unused and installed older versions when possible and at their convenience.

Figure 5:
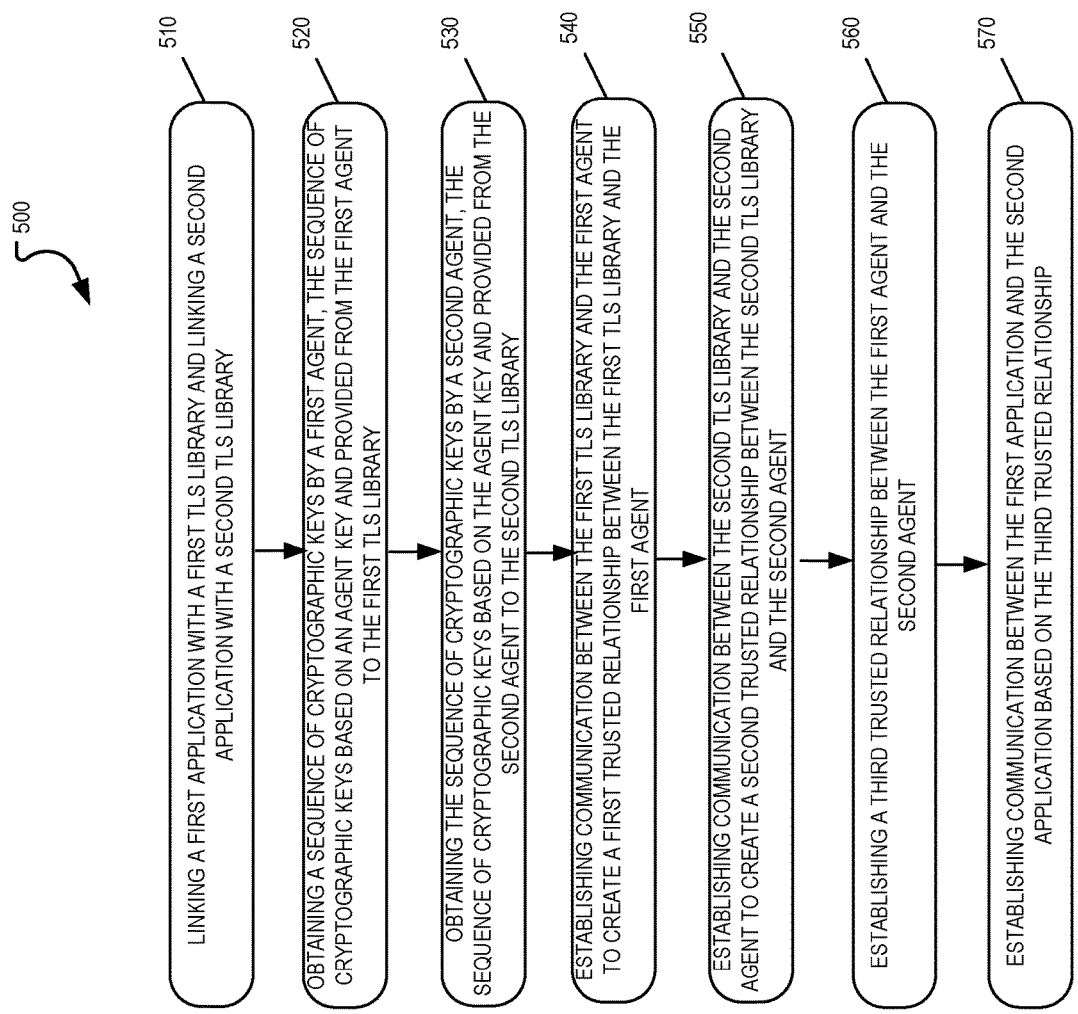
FIG. 5 is a flowchart of another method for communicating data between the first application and the second application based on transitive trust according to an example of the instant disclosure.

FIG. 5 illustrates an example method 500 for communicating data between the first application 108 and the second application 114 based on transitive trust. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes linking the first application 108 with the first TLS library 110 to create a trust relation and linking the second application 114 with the second TLS library 116 to create another trust relation at block 510.

According to some examples, the method 500 includes obtaining a sequence of cryptographic keys by the first agent 112, the sequence of cryptographic keys based on an agent key and provided from the first agent 112 to the first TLS library 110 at block 520. According to some examples, the method 500 includes obtaining the sequence of cryptographic keys by the second agent 118, the sequence of cryptographic keys based on the agent key and provided from the second agent 118 to the second TLS library 116 to create a trust relation through the linked applications that can use the TLS libraries at block 530.

According to some examples, the method 500 includes establishing communication between the first TLS library 110 and the first agent 112 to create a first trusted relationship using a first trust key between the first TLS library 110 and the first agent 112 at block 540.

According to some examples, the method 500 includes establishing communication between the second TLS library 116 and the second agent 118 to create a second trusted relationship using a second trust key between the second TLS library 116 and the second agent 118 116 at block 550.

According to some examples, the method 500 includes establishing a third trusted relationship between the first agent 112 and the second agent 118 using an agent key at block 560. According to some examples, the method 500 includes establishing communication between the first application 108 and the second application 114 based on the third trusted relationship at block 570. As a result, the first application 108 transitively trusts the second agent 118 and the second application 114 transitively trusts the first agent 112.

This allows the first agent 112 to encrypt a first private key and the second agent 118 to encrypt a second private key. The first agent 112 can rotate the first private key to a third private key and the second agent can rotate the second private key to a fourth private key. As a result, the method 500 may further include maintaining the communication between the first application 108 and the second application 114 based on the third trusted relationship using the third private key and the fourth private key. In one example, the first agent 112 stores the first private key and the second agent 118 stores the second private key.

According to some examples, the method 500 includes linking the first application 108 with the first TLS library 110 using an Application Programming Interface (API) and linking the second application 114 with the second TLS library 116 using the API, wherein the API is backwardly compatible.

According to some examples, the method 500 includes swapping a first or old version of the first TLS library with a second version of the first TLS library 110 using the API and swapping a first or old version of the second TLS library with a second version of the second TLS library using the API.

According to some examples, the method 500 includes upgrading the first version of the first TLS library to a second version of the first TLS library using the API and upgrading a first version of the second TLS library to a second version of the second TLS library using the API.

According to some examples, the method 500 includes maintaining the first application 108 by limiting modifications only to modifying a first version of the first TLS library to a second version of the first TLS library using the API and maintaining the second application 114 by limiting modifications to a first version of the second TLS library to a second version of the second TLS library using the API.

Some terms have been used in this disclosure including the following:

Reverse proxy: In computer networks, a reverse proxy is a type of proxy server that retrieves resources on behalf of a client from one or more servers. These resources are then returned to the client, appearing as if they originated from the reverse proxy server itself.

Forward Proxy

In computer networking, a forward proxy is a server application or appliance that acts as an intermediary for requests from clients seeking resources from servers that provide those resources. A forward proxy thus functions on behalf of the client when requesting service, potentially masking the true origin of the request to the resource server.

Virtual Machine: In computing, a virtual machine (VM) is an emulation of a computer system. Virtual machines are based on computer architectures and provide functionality of a physical computer. Their implementations may involve specialized hardware, software, or a combination of hardware and software.

Container: Like virtual machines, containers allow you to package your application together with libraries and other dependencies, providing isolated environments for running your software services.

Message Digest: A message digest (aka cryptographic hash function) is a mathematical algorithm that maps data of arbitrary size (often called the "message") to a bit array of a fixed size (the "hash value", "hash", or "message digest"). It is a one-way function, that is, a function which is practically infeasible to invert. An example of a message digest is SHA-512.

Firewall: In computing, a firewall is a network security system that monitors and controls incoming and outgoing network traffic based on predetermined security rules. A firewall typically establishes a barrier between a trusted network and an untrusted network.

Protected network: A protected network is a network protected by a firewall or network security group acting as a barrier.

VLAN: A virtual LAN (VLAN) is any broadcast domain that is partitioned and isolated in a computer network at the data link layer (OSI layer 2). LAN is the abbreviation for local area network and in this context virtual refers to a physical object recreated and altered by additional logic.

Network Security Group: A network security group is a simple firewall that operates in a cloud. A network security group contains security rules that allow or deny inbound network traffic to, or outbound network traffic from, several types of resources. For each rule, one can specify source and destination, port, and protocol.

True random number generator: In computing, a hardware random number generator (HRNG) or true random number generator (TRNG) is a device that generates random numbers from a physical process, rather than by means of an algorithm. Such devices are often based on microscopic phenomena that generate low-level, statistically random "noise" signals, such as thermal noise, the photoelectric effect, involving a beam splitter, and/or other quantum phenomena. These stochastic processes are, in theory, completely unpredictable, and the theory's assertions of unpredictability are subject to experimental test. This is in contrast to the paradigm of pseudo-random number generation commonly implemented in computer programs. Some means of building a true random number generator using quantum techniques are:

A nuclear decay radiation source, detected by a Geiger counter attached to a computing device.

Photons travelling through a semi-transparent mirror. The mutually exclusive events (reflection/transmission) are detected and associated to '0' or '1' bit values respectively.

Quantum Safe: Post-quantum cryptography (sometimes referred to as quantum-proof, quantum-safe or quantum-resistant) refers to cryptographic algorithms (usually public-key algorithms) that are thought to be secure against an attack by a quantum computer. As of present day, this is not true for the most popular public-key algorithms, which can be efficiently broken by a sufficiently strong quantum computer.

DHE-PSK: First, perform the Diffie-Hellman computation in the same way as for other Diffie-Hellman-based ciphersuites in TLS. Let Z be the value produced by this computation (with leading zero bytes stripped as in other Diffie-Hellman-based ciphersuites). Concatenate a uint16 containing the length of Z (in octets), Z itself, a uint16 containing the length of the PSK (in octets), and the PSK itself.

HMAC: FIPS PUB 198-1, Federal Information Processing Standards Publication, The Keyed-Hash Message Authentication Code (HMAC), National Institute of Standards and Technology, July, 2008.

HKDF: RFC 5869

TLS 1.3: RFC 8446

SHA-256, SHA-512: FIPS PUB 180-2, FIPS PUB 180-4

White Box Cryptography: Wyseur, Brecht, "White-Box Cryptography: Hiding Keys in Software", NAGRA Kudelski Group, Switzerland.

In another example, the first application 108 linked with the first TLS library 110 mutually authenticates using certificates with the second application 114 linked with the second TLS library. In the context of the TLS handshake in accordance to RFC 8446, each respective application may prove its identity by executing a digital signature operation. The first agent 112 can read a file containing the encrypted private key 422 and then decrypts the private key into its memory. The first TLS library 110 may present information to be signed to the first agent 112 which signs the information using private key 422 and returns the signed result to the first TLS library 110. The second TLS library 116 may present information to be signed to the second agent 118 which signs the information using private key 432 and returns the signed result to the first TLS library 116.

In another example, the first application 108 linked with the first TLS library 110 mutually authenticates using certificates with the second application 114 linked with the second TLS library. In the context of the TLS handshake in accordance to RFC 8446, each respective application may prove its identity by executing a digital signature operation. The first agent 112 can read a file containing the encrypted private key 422 and then decrypts the private key into its memory. The first TLS library 110 may retrieve the private key 422 from the first agent 112 and execute digital signatures as required by RFC 8446 to mutually authenticate with certificates. The second TLS library 116 may retrieve private key 432 from the second agent 118 and execute digital signatures as required by RFC 8446 to mutually authenticate with certificates.

Figure 6:
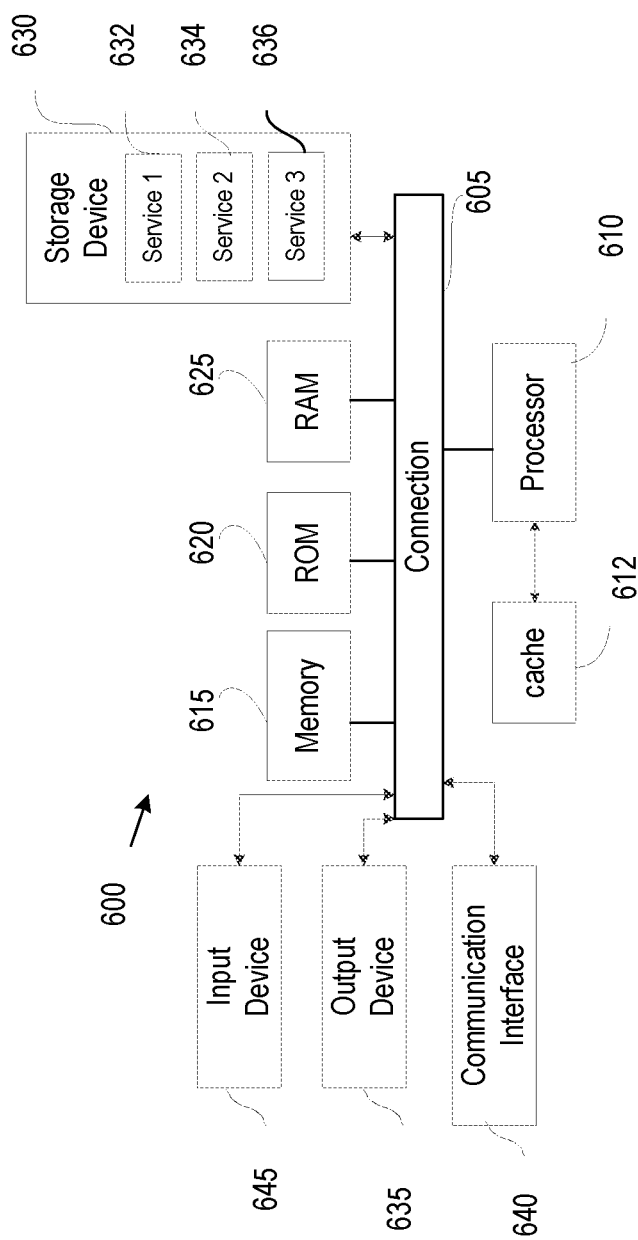
FIG. 6 shows an example of a system for implementing certain aspects of the present technology.

FIG. 6 shows an example of computing system 600, which can be for example any computing device making up the first computing device 102, the second computing device 104, or the root-distributor 302, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, cloud, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: requesting, by a first computing device having a first application and a first Transport Layer Security (TLS) library, a sequence of cryptographic keys obtained by a first agent, the sequence of cryptographic keys based on an agent key and provided by the first agent to the first TLS library; requesting, by a second computing device having a second application and a second TLS library, the sequence of cryptographic keys obtained by a second agent, the sequence of cryptographic keys based on the agent key and provided by the second agent to the second TLS library; and communicating between the first application of the first computing device to the second application of the second computing device using the sequence of cryptographic keys based on the agent key.

Aspect 2: The method of Aspect 1, wherein each cryptographic key in the sequence of cryptographic keys is at least one hundred and twenty-eight bits in length.

Aspect 3: The method of any of Aspects 1 to 2, wherein a first cryptographic key in the sequence of cryptographic keys rotates to a second cryptographic key in the sequence of cryptographic keys.

Aspect 4: The method of any of Aspects 1 to 3, wherein at least one of the first computing device and the second computing device is an Internet of things (IoT) device.

Aspect 5: The method of any of Aspects 1 to 4, wherein at least one of the first TLS library and the second TLS library is associated with OpenSSL.

Aspect 6: The method of any of Aspects 1 to 5, wherein the sequence of cryptographic keys comprises a sequence of pre-shared keys deployed by agents who mutually authenticated using a method based upon a Zero Knowledge Proof.

Aspect 7: The method of any of Aspects 1 to 6, wherein the first TLS library and the second TLS library implement Datagram Transport Layer Security (DTLS).

Aspect 8: The method of any of Aspects 1 to 7, wherein the first agent and the second agent create a TLS connection using a shared secret password and generate a first cryptographic key in the sequence of cryptographic keys.

Aspect 9: The method of any of Aspects 1 to 8, wherein the first agent derives a first cryptographic key of the sequence of cryptographic keys by computing a message digest over the first cryptographic key and truncating to at least one hundred and twenty-eight bits.

Aspect 10: The method of any of Aspects 1 to 9, wherein the first application interfaces with the first TLS library using an Application Programming Interface (API).

Aspect 11: The method of any of Aspects 1 to 10, wherein the first agent and the second agent create a TLS connection authenticated using asymmetric private keys validated with asymmetric public keys and generate a first cryptographic key in the sequence of cryptographic keys.

Aspect 12: The method of any of Aspects 1 to 11, further comprising decrypting the data using the one key of the sequence of cryptographic keys by the second application.

Aspect 13: The method of any of Aspects 1 to 12, wherein the first computing device is a client computing device and the second computing device is a server computing device.

Aspect 14: The method of any of Aspects 1 to 13, wherein the first agent and the second agent operate a key agreement protocol to generate the sequence of cryptographic keys.

Aspect 15: The method of any of Aspects 1 to 14, wherein the key agreement protocol is based on a quantum safe cryptographic algorithm.

Aspect 16: The method of any of Aspects 1 to 15, wherein all cryptographic algorithms are quantum safe.

Aspect 17: The method of any of Aspects 1 to 16, wherein the key agreement protocol provides quantum safe protection against a record-now-decrypt-later attack.

Aspect 18: The method of any of Aspects 1 to 17, wherein a first cryptographic key in the sequence of cryptographic keys rotates to a second cryptographic key in the sequence of cryptographic keys after a first hour and the second cryptographic key in the sequence of cryptographic keys rotates to a third cryptographic key in the sequence of cryptographic keys after a second hour.

Aspect 19: The method of any of Aspects 1 to 18, further comprising generating a log of the communication between the first computing device and the second computing device and storing the log of the communication.

Aspect 20: The method of any of Aspects 1 to 19, further comprising displaying a user interface that shows the log of the communication between the first computing device and the second computing device.

Aspect 21: The method of any Aspects 1 to 20, wherein the log comprises at least one of an algorithm, a key length, a name of a pre-shared key (PSK), a version of a protocol, and IP addresses of the first agent and the second agent.

Aspect 22: The method of any Aspects 1 to 21, wherein the first application interfaces with the first TLS library using aspects of an Application Programming Interface (API) that is identical to a TLS library that authenticates using certificates that hold asymmetric keys.

Aspect 23: The method of any of Aspects 1 to 22, wherein the first TLS library receives the sequence of cryptographic keys when the first agent is authorized to provide the sequence of cryptographic keys.

Aspect 24: The method of any of Aspects 1 to 23, wherein a root distributor enforces authorization of the first agent by determining whether the first agent is authorized to communicate with the second agent.

Aspect 25: A system including a first computing device having a memory, at least one processor, a first application, and a first Transport Layer Security (TLS) library, the first computing device to request a sequence of cryptographic keys obtained by a first agent, the sequence of cryptographic keys based on an agent key and provided by the first agent to the first TLS library; a second computing device having a memory, at least one processor, a second application, and a second TLS library, the second computing device to request the sequence of cryptographic keys obtained by a second agent, the sequence of cryptographic keys based on the agent key and provided by the second agent to the second TLS library; and the first computing device and the second computing device to communicate between the first application of the first computing device and the second application of the second computing device using the sequence of cryptographic keys based on the agent key.

Aspect 26: A non-transitory computer-readable storage medium, having instructions stored thereon that, when executed by at least one computing device cause the at least one computing device to perform operations, the operations comprising: requesting, by a first computing device having a first application and a first Transport Layer Security (TLS) library, a sequence of cryptographic keys obtained by a first agent, the sequence of cryptographic keys based on an agent key and provided by the first agent to the first TLS library; requesting, by a second computing device having a second application and a second TLS library, the sequence of cryptographic keys obtained by a second agent, the sequence of cryptographic keys based on the agent key and provided by the second agent to the second TLS library; and communicating between the first application of the first computing device to the second application of the second computing device using the sequence of cryptographic keys based on the agent key.

Aspect 27: A method comprising: linking a first application with a first Transport Layer Security (TLS) library, linking a second application with a second TLS library, obtaining a sequence of cryptographic keys by a first agent, the sequence of cryptographic keys based on an agent key and provided from the first agent to the first TLS library, obtaining the sequence of cryptographic keys by a second agent, the sequence of cryptographic keys based on the agent key and provided from the second agent to the second TLS library, establishing communication between the first TLS library and the first agent to create a first trusted relationship between the first application and the first TLS library, establishing communication between the second TLS library and the second agent to create a second trusted relationship between the second application and the second TLS library, establishing a third trusted relationship between the first agent and the second agent, and establishing communication between the first application and the second application based on the third trusted relationship.

Aspect 28: The method of Aspect 27, further comprising linking the first application with the first TLS library using an Application Programming Interface (API) and linking the second application with the second TLS library using the API, wherein the API is backwardly compatible.

Aspect 29: The method of any of Aspects 27 to 28, further comprising swapping a first version of the first TLS library with a second version of the first TLS library using the API and swapping a first version of the second TLS library with a second version of the second TLS library using the API.

Aspect 30: The method of any of Aspects 27 to 29, further comprising upgrading the first version of the first TLS library to a second version of the first TLS library using the API and upgrading a first version of the second TLS library to a second version of the second TLS library using the API.

Aspect 31: The method of any of Aspects 27 to 30, further comprising maintaining the first application by limiting modifications only to modifying a first version of the first TLS library to a second version of the first TLS library using the API and maintaining the second application by limiting modifications to a first version of the second TLS library to a second version of the second TLS library using the API.

Aspect 32: The method of any of Aspects 27 to 31, wherein the first application transitively trusts the second agent and the second application transitively trusts the first agent.

Aspect 33: The method of any of Aspects 27 to 32, wherein the first agent encrypts a first private key and the second agent encrypts a second private key.

Aspect 34: The method of any of Aspects 27 to 33, wherein the first agent stores the first private key and the second agent stores the second private key.

Aspect 35: The method of any of Aspects 27 to 34, further comprising establishing the communication between the first application and the second application based on the first, second, and third trusted relationship.

Aspect 36: A system comprising: linking a first application with a first Transport Layer Security (TLS) library, linking a second application with a second TLS library, obtaining a sequence of cryptographic keys by a first agent, the sequence of cryptographic keys based on an agent key and provided from the first agent to the first TLS library, obtaining the sequence of cryptographic keys by a second agent, the sequence of cryptographic keys based on the agent key and provided from the second agent to the second TLS library, establishing communication between the first TLS library and the first agent to create a first trusted relationship between the first TLS library and the first agent, establishing communication between the second TLS library and the second agent to create a second trusted relationship between the second TLS library and the second agent, establishing a third trusted relationship between the first agent and the second agent, and establishing communication between the first application and the second application based on the third trusted relationship.

Aspect 37: The system of Aspect 36, the first application linking with the first TLS library using an Application Programming Interface (API) and linking the second application with the second TLS library using the API, wherein the API is backwardly compatible.

Aspect 38: The system of any of Aspects 36 to 37, the first TLS library swapping a first version of the first TLS library with a second version of the first TLS library using the API and the second TLS library swapping a first version of the second TLS library with a second version of the second TLS library using the API.

Aspect 39: The system of any of Aspects 36 to 38, the first TLS library upgrading a first version of the first TLS library to a second version of the first TLS library using the API and the second TLS library upgrading a first version of the second TLS library to a second version of the second TLS library using the API.

Aspect 40: The system of any of Aspects 36 to 39, the first application maintaining the first application by limiting modifications only to modifying a first version of the first TLS library to a second version of the first TLS library using the API and maintaining the second application by limiting modifications to a first version of the second TLS library to a second version of the second TLS library using the API.

Aspect 41: The system of any of Aspects 36 to 40, wherein the first application transitively trusts the second agent and the second application transitively trusts the first agent.

Aspect 42: The system of any of Aspects 36 to 41, wherein the first agent encrypts a first private key and the second agent encrypts a second private key.

Aspect 43: The system of any of Aspects 36 to 42, wherein the first agent stores the first private key and the second agent stores the second private key.

Aspect 44: The system of any of Aspects 36 to 43, wherein the communication is established between the first application and the second application based on the first, second, and third trusted relationship.

Aspect 45: A non-transitory computer-readable storage medium, having instructions stored thereon that, when executed by at least one computing device cause the at least one computing device to perform operations, the operations comprising linking a first application with a first Transport Layer Security (TLS) library, linking a second application with a second TLS library, obtaining a sequence of cryptographic keys by a first agent, the sequence of cryptographic keys based on an agent key and provided from the first agent to the first TLS library, obtaining the sequence of cryptographic keys by a second agent, the sequence of cryptographic keys based on the agent key and provided from the second agent to the second TLS library, establishing communication between the first TLS library and the first agent to create a first trusted relationship between the first TLS library and the first agent, establishing communication between the second TLS library and the second agent to create a second trusted relationship between the second TLS library and the second agent, establishing a third trusted relationship between the first agent and the second agent, and establishing communication between the first application and the second application based on the third trusted relationship.

Aspect 46: The non-transitory computer-readable storage medium of Aspect 45, the operations further comprising linking the first application with the first TLS library using an Application Programming Interface (API) and linking the second application with the second TLS library using the API, wherein the API is backwardly compatible.

Aspect 47: The non-transitory computer-readable storage medium of Aspects 45 to 46, the operations further comprising swapping a first version of the first TLS library with a second version of the first TLS library using the API and swapping a first version of the second TLS library with a second version of the second TLS library using the API.

Aspect 48: The non-transitory computer-readable storage medium of Aspects 45 to 47, the operations further comprising upgrading a first version of the first TLS library to a second version of the first TLS library using the API and upgrading a first version of the second TLS library to a second version of the second TLS library using the API.

Aspect 49: The non-transitory computer-readable storage medium of Aspects 45 to 48, the operations further comprising maintaining the first application by limiting modifications only to modifying a first version of the first TLS library to a second version of the first TLS library using the API and maintaining the second application by limiting modifications to a first version of the second TLS library to a second version of the second TLS library using the API.

Aspect 50: The non-transitory computer-readable storage medium of Aspects 45 to 49, wherein the first application transitively trusts the second agent and the second application transitively trusts the first agent.

Aspect 51: The non-transitory computer-readable storage medium of Aspects 45 to 50, wherein the first agent encrypts a first private key and the second agent encrypts a second private key.

Aspect 52: The non-transitory computer-readable storage medium of Aspects 45 to 51, wherein the first agent stores the first private key and the second agent stores the second private key.

Aspect 53: The non-transitory computer-readable storage medium of Aspects 45 to 52, the operations further comprising establishing the communication between the first application and the second application based on the first, second, and third trusted relationship.

What is claimed is:

1. A method comprising:
   requesting, by a first computing device having a first application and a first Transport Layer Security (TLS) library, a sequence of cryptographic keys obtained by a first agent, the sequence of cryptographic keys based on an agent key comprising a shared secret password and provided by the first agent to the first TLS library;
   requesting, by a second computing device having a second application different from the first application and a second TLS library different from the first TLS library, the sequence of cryptographic keys obtained by a second agent, the sequence of cryptographic keys based on the agent key and provided by the second agent to the second TLS library, the first agent and the second agent creating a TLS connection using a cryptographically generated initial key comprising a first cryptographic key and each of the first agent and the second agent generating the first cryptographic key in the sequence of cryptographic keys, the TLS connection authenticated using the first cryptographic key or via asymmetric private keys validated with asymmetric public keys by the first agent and the second agent; and
   communicating a plurality of messages between the first application of the first computing device to the second application of the second computing device using a cryptographic protocol to provide mutual authentication and identical rotation of cryptographic keys in the sequence of cryptographic keys for each of the first computing device and the second computing device, each message of the plurality of messages using the first cryptographic key of the sequence of cryptographic keys based on the agent key for a particular period of time until one of the first TLS library and the second TLS library generates a same updated cryptographic key of the sequence of cryptographic keys, the communicating for the particular period of time comprising encrypting each message of the plurality of messages using the first cryptographic key and decrypting each message of the plurality of messages using the first cryptographic key.

2. The method of claim 1, wherein each cryptographic key in the sequence of cryptographic keys is at least one hundred and twenty-eight bits in length.

3. The method of claim 1, wherein the first cryptographic key in the sequence of cryptographic keys rotates to the same updated cryptographic key comprising a second cryptographic key in the sequence of cryptographic keys.

4. The method of claim 1, wherein at least one of the first computing device and the second computing device is an Internet of things (IoT) device.

5. The method of claim 1, wherein at least one of the first TLS library and the second TLS library is associated with OpenSSL or other libraries that can be used to create TLS sessions.

6. The method of claim 1, wherein the sequence of cryptographic keys comprises a sequence of pre-shared keys deployed by agents who mutually authenticated using a method based upon a Zero Knowledge Proof.

7. The method of claim 1, wherein the first TLS library and the second TLS library implement Datagram Transport Layer Security (DTLS).

8. The method of claim 1, wherein the first agent derives the first cryptographic key of the sequence of cryptographic keys by computing a message digest over the first cryptographic key and truncating to at least one hundred and twenty-eight bits.

9. The method of claim 1, wherein the first application interfaces with the first TLS library using an Application Programming Interface (API).

10. The method of claim 1, further comprising decrypting using one cryptographic key of the sequence of cryptographic keys by the second application.

11. The method of claim 1, wherein the first computing device is a client computing device and the second computing device is a server computing device.

12. The method of claim 1, wherein the first agent and the second agent operate a key agreement protocol to generate the sequence of cryptographic keys.

13. The method of claim 12, wherein the key agreement protocol is based on a quantum safe cryptographic algorithm.

14. The method of claim 12, wherein all cryptographic algorithms are quantum safe.

15. The method of claim 12, wherein the key agreement protocol provides quantum safe protection against a record-now-decrypt-later attack.

16. The method of claim 1, wherein the first cryptographic key in the sequence of cryptographic keys rotates to the same updated cryptographic key comprising a second cryptographic key in the sequence of cryptographic keys after a first hour and the second cryptographic key in the sequence of cryptographic keys rotates to a third cryptographic key in the sequence of cryptographic keys after a second hour.

17. The method of claim 1, further comprising generating a log of the communication between the first computing device and the second computing device and storing the log of the communication.

18. The method of claim 17, further comprising displaying a user interface that shows the log of the communication between the first computing device and the second computing device.

19. The method of claim 18, wherein the log comprises at least one of an algorithm, a key length, a name of a pre-shared key (PSK), a version of a protocol, and IP addresses of the first agent and the second agent.

20. The method of claim 1, wherein the first application interfaces with the first TLS library using aspects of an Application Programming Interface (API) that is identical to a TLS library that authenticates using certificates that hold asymmetric keys.

21. The method of claim 1, where the first TLS library receives the sequence of cryptographic keys when the first agent is authorized to provide the sequence of cryptographic keys.

22. The method of claim 1, wherein a root distributor enforces authorization of the first agent by determining whether the first agent is authorized to communicate with the second agent.

23. A system comprising:
 a first computing device having a memory, at least one processor, a first application, and a first Transport Layer Security (TLS) library, the first computing device to request a sequence of cryptographic keys obtained by a first agent, the sequence of cryptographic keys based on an agent key comprising a shared secret password and provided from the first agent to the first TLS library;
 a second computing device having a memory, at least one processor, a second application different from the first application, and a second TLS library different from the first TLS library, the second computing device to request the sequence of cryptographic keys obtained by a second agent, the sequence of cryptographic keys based on the agent key and provided from the second agent to the second TLS library, the first agent and the second agent creating a TLS connection using a cryptographically generated initial key comprising a first cryptographic key and each of the first agent and the second agent generating the first cryptographic key in the sequence of cryptographic keys, the TLS connection authenticated using the first cryptographic key or via asymmetric private keys validated with asymmetric public keys by the first agent and the second agent; and
 the first computing device and the second computing device to communicate a plurality of messages between the first application of the first computing device and the second application of the second computing device using a cryptographic protocol to provide mutual authentication and identical rotation of cryptographic keys in the sequence of cryptographic keys for each of the first computing device and the second computing device, each message of the plurality of messages using a first cryptographic key of the sequence of cryptographic keys based on the agent key for a particular period of time until one of the first TLS library and the second TLS library generates a same updated cryptographic key of the sequence of cryptographic keys, the communicating for the particular period of time comprising encrypting each message of the plurality of messages using the first cryptographic key and decrypting each message of the plurality of messages using the first cryptographic key.

24. A non-transitory computer-readable storage medium, having instructions stored thereon that, when executed by at least one computing device cause the at least one computing device to perform operations, the operations comprising:
 requesting, by a first computing device having a first application and a first Transport Layer Security (TLS) library, a sequence of cryptographic keys obtained by a first agent, the sequence of cryptographic keys based on an agent key comprising a shared secret password and provided from the first agent to the first TLS library;
 requesting, by a second computing device having a second application different from the first application and a second TLS library different from the first TLS library, the sequence of cryptographic keys obtained by a second agent, the sequence of cryptographic keys based on the agent key and provided from the second agent to the second TLS library, the first agent and the second agent creating a TLS connection using a cryptographically generated initial key comprising a first cryptographic key and each of the first agent and the second agent generating the first cryptographic key in the sequence of cryptographic keys, the TLS connection authenticated using the first cryptographic key or via asymmetric private keys validated with asymmetric public keys by the first agent and the second agent; and
 communicating a plurality of messages between the first application of the first computing device to the second application of the second computing device using a cryptographic protocol to provide mutual authentication and identical rotation of cryptographic keys in the sequence of cryptographic keys for each of the first computing device and the second computing device, each message of the plurality of messages using a first cryptographic key of the sequence of cryptographic keys based on the agent key for a particular period of time until one of the first TLS library and the second TLS library generates a same updated cryptographic key of the sequence of cryptographic keys, the communicating for the particular period of time comprising encrypting each message of the plurality of messages using the first cryptographic key and decrypting each message of the plurality of messages using the first cryptographic key.

* * * * *